March 31, 1964   J. P. DE LANEY   3,126,843
PALLET AND FORM FOR MAKING SAME
Filed July 9, 1962   2 Sheets-Sheet 1

INVENTOR
JOHN P. DELANEY
BY
Walter J. Wessendorf
attorney

March 31, 1964  J. P. DE LANEY  3,126,843
PALLET AND FORM FOR MAKING SAME
Filed July 9, 1962  2 Sheets-Sheet 2

INVENTOR.
JOHN P. DELANEY
BY
Walter F. Wessendorf Jr.
attorney

United States Patent Office 3,126,843
Patented Mar. 31, 1964

3,126,843
PALLET AND FORM FOR MAKING SAME
John P. De Laney, 800 Riverside Ave., Scotia 2, N.Y.
Filed July 9, 1962, Ser. No. 208,255
4 Claims. (Cl. 108—52)

This invention relates to the building of pallets from basic elements and a form that may be utilized in constructing the pallets.

There is need in the pallet art for inexpensive basic elements with which to construct pallets. The elements must be inexpensive to manufacture, easy to assemble, light of weight to save shipping costs and be easy to handle in constructing pallets from same, strong in order that same will stand up under usage and uniformly manufactured to allow a basic element to replace a damaged basic element of an assembled pallet.

The object of this invention is to provide basic elements to construct pallets. The basic elements are made of suitable plastic material and as such are inexpensive to manufacture.

Another object of the invention is to provide plastic basic elements to the top and bottom portions of which adhesive has been preapplied covered with paper stripping to allow the basic elements to be easily assembled into pallets.

A still further object of the invention is to provide basic elements that are light in weight in order that shipping costs may be saved when the disassembled pallet units are shipped to a remote destination for assembly and use at the destination as pallets. The basic elements being of light weight is of further benefit in the handling of the pallets formed from the basic elements.

Another object of the invention is to provide light weight plastic basic elements that are made stronger with attendant structural rigidity by combining plywood strips with the plastic basic elements.

A still further object of the invention is to provide basic elements that are uniformly made in order that the repair of a damaged basic element of the assembled pallet may be effected by replacing the damaged element with an undamaged element.

Another object of the invention should be obvious from the use of the adhesive to bond the basic elements in that constructed pallets may be disassembled for storage or other use.

A still further object of the invention is to provide a form to assemble and construct the pallets from the basic elements.

These and other objects of the invention should be appreciated from the detailed specification taken in conjunction with the drawings, in which like reference numerals refer to similar parts, in which.

Figure 1:
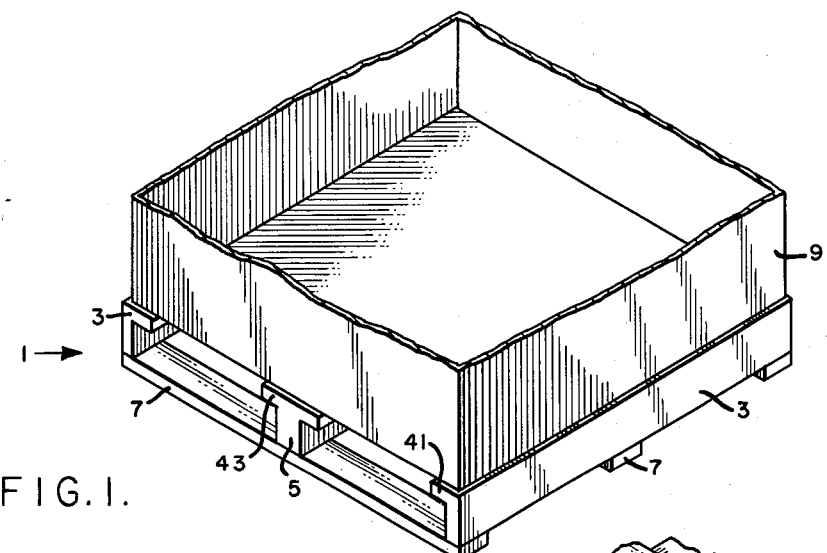
FIG. 1 is a perspective view of one embodiment of the invention.

Referring now to the drawings, reference numeral 1, in FIG. 1, generally refers to the invention with a container placed on the pallet. The pallet is constructed from two L-shaped runners 3 made of suitable plastic material. These runners 3 are placed and form the two opposite sides of the pallet with a T-shaped runner 5, made of suitable plastic materials, interposed therebetween.

Not shown in FIG. 1 is the adhesive preapplied to those portions of the top and bottom portions of the runners whereon are secured the cross-slats. Removable paper strippings cover those preapplied adhesive areas on the runners.

Three cross-slats 7 preferably made of wood are secured to the bottom portions of the runners 3 and 5 after the paper strippings covering the adhesive areas thereon have first been removed. Sufficient pressure, it should be appreciated, is applied to the cross-slats 7 to bond same to the runners 3 and 5.

Depicted also in FIG. 1 is a container 9 which is placed on top of the assembled and constructed pallet. The adhesive recited and described heretofore may be optionally applied to the top portion of the runners 3 and 5 in order that the container 9 may be secured to the top portions of the runners 3 and 5.

Figure 2:
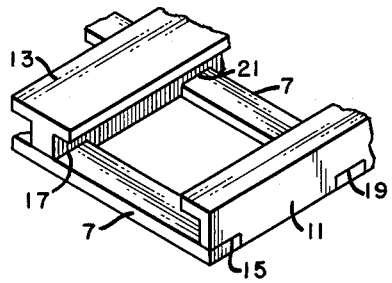
FIG. 2 is a fragmentary perspective view of another embodiment of the invention.

The pallet constructed shown in FIG. 2 has the two L-shaped runners and the one T-shaped runner and the three cross-slats that were utilized in a manner and arrangement similar to the pallet constructed and as depicted in FIG. 1. However, to achieve strength and structural rigidity for the pallet, the L-shaped runners 11 and T-shaped runner 13 have end cut-out portions 15 and 17, respectively, complemental to the cross-sectional areas of the cross-slats 7 and centrally located cut-out portions 19 and 21, respectively, complementary to the cross-sectional areas of the cross-slats 7 in order that the cross-slats will be received in these cut-out portions 15, 17, 19, 21 upon assembly and construction of the pallet 1.

Figure 3:
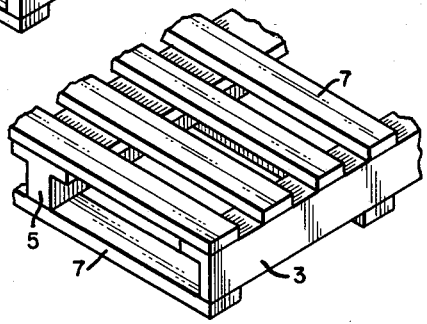
FIG. 3 is a fragmentary perspective view of another embodiment of the invention.

In FIG. 3 is shown a pallet similar to the pallet shown in FIG. 1, however, to provide the pallets with additional strength and structural rigidity cross-slats 7 are also secured to the top portion of the runners 3 and 5.

Figure 4:
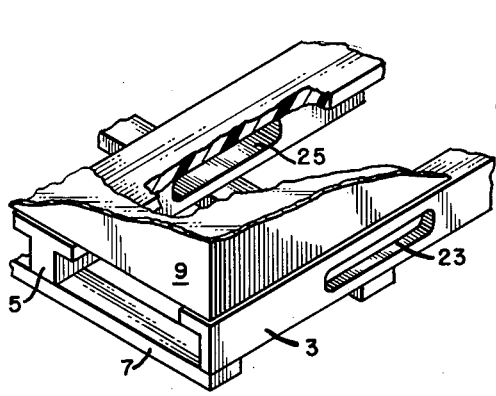
FIG. 4 is a fragmentary perspective view, partly in section of another embodiment of the invention.

In FIG. 4 is shown a pallet similar to the pallet shown in FIG. 1. However, two lengthwise slots 23 are formed in each L-shaped runner 3 and two lengthwise slots 25 are formed in the T-shaped runner 5. The slots 23 and 25 are in alignment with ane another in order that the fork lift elements of the fork lift truck (not shown) may be inserted therein from the side to facilitate the placing of and removal of the pallets in different locations and accessibility of such locations for the lift truck.

Figure 5:
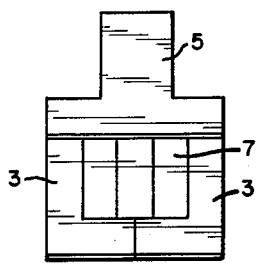
FIG. 5 is an end view depicting one form of arrangement of the runners and cross-slats for storing or shipping as a pallet unit.

In FIG. 5 is shown an arrangement of the two L-shaped runners 3, one T-shaped runner 5 and three cross-slats 7 as a disassembled pallet unit for shipping or storing same.

Figure 6:
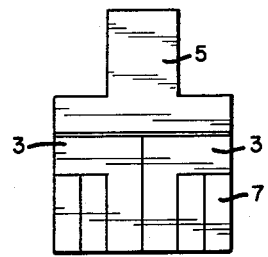
FIG. 6 is an end view depicting another form of arrangement of the runners and cross-slats for storing or shipping as a pallet unit.

In FIG. 6 is shown an arrangement of the two L-shaped runners 3, one T-shaped runner 5 and four cross-slats 7 as a disassembled pallet unit for shipping or storing same.

In FIG. 5 is shown the paper stripping covering the adhesive on T-shaped runner and on the L-shaped runner 3; in FIG. 6 is shown the paper stripping covering the adhesive on runners 3 and runner 5. In FIG. 6, the paper stripping on runners 3 and 5 is arranged back to back.

It is within the concept of this invention to provide a band (not shown) or other suitable fastening means to wrap around each of the disassembled pallet units shown in FIG. 5 and FIG. 6.

Figure 7:
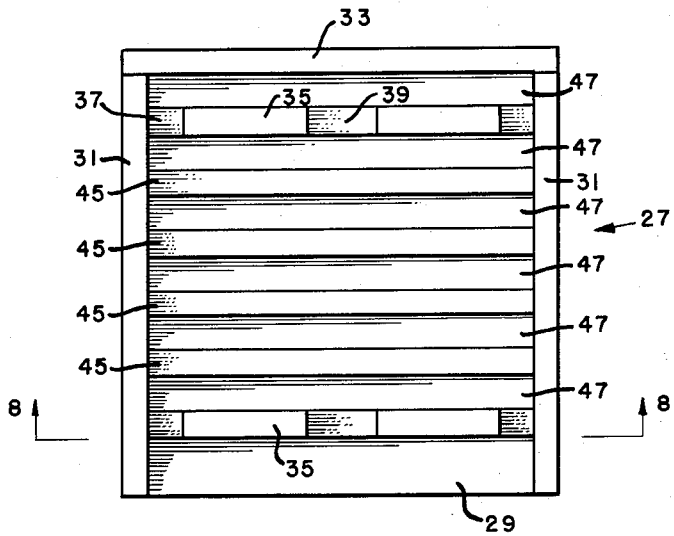
FIG. 7 is a top plan view of the form utilized to assemble and construct the pallet from the runners and cross-slats.
Figure 8:
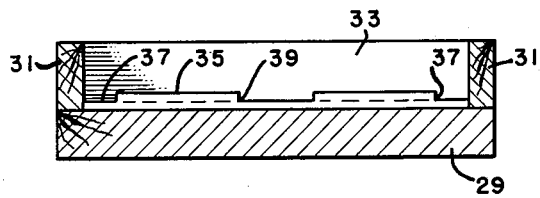
FIG. 8 is a sectional view taken along the line 8—8 of FIG. 7.

In FIG. 7 and FIG. 8 are shown the form that may be utilized to assemble and construct the pallets. The form, generally referred to by reference numeral 27, has a base plate 29, two longitudinal upstanding side pieces 31 and an end piece 33. Suitably secured to the base plate 29 and located thereon as shown are longitudinal upstanding runner locaters 35. Each runner locater 35 has two cut-out portions 37 and one cut-out portion 39 complemental but slightly larger than the cross-sectional area occupied, respectively by the leg 41 of L-shaped runner 3 or 11 and the T 43 of the T-shaped runner 5 or 13 to facilitate placing same therein and removal of same therefrom.

Interposed between the runner locaters 35 are four longitudinal and upstanding spacer strips 45. The one runner locater 35 adjacent end piece 33 is positioned on the base plate 29 in such a manner that a cross-slat 7 may be freely received in space 47 provided by the end piece 33 and this runner locater 35. Likewise the spacer strips 45 and other runner locater 35 are positioned on base plate 29 in such a manner that cross-slats 7 may be freely received in the spaces 47 formed thereby.

In utilizing the form 27 to assemble and construct the pallet shown in FIG. 3 six cross-slats 7 would be placed flat in the spaces 47 and the seventh cross-slat would be placed flat and in abutting relationship to the open side of the lower runner locater 35. The paper stripping would be removed from the adhesive areas of the top portions of the two runners 3 and runner 5. It should be appreciated that when the cross-slats 7 are emplaced in form 27, the thickness of the cross-slats 7 is greater than the dimensional thickness of the runner locater 35 at the positions thereon of the cut-out portions 37 and 39. Hence, upon placing the legs 41 in cut-out portions 37 and the T 43 in the cut-out portions 39, no contact will be made between the adhesive on legs 41 and the bottom of cut-out portions 37 and the T 43 and the cut-out portions 39.

After emplacement of the cross-slats 7 and runners 3 and 5 in the form as heretofore described, binding engagement of the cross-slats and exposed adhesive surfaces of the runner 3 and 5 may be effectuated by the application of equal pressure to the runner 3 and 5 by suitable pressure applying means such as a hydraulic press.

Figure 9:
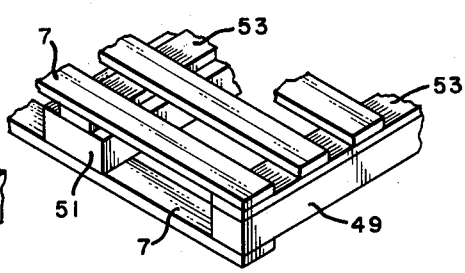
FIG. 9 is a fragmentary perspective view of another embodiment of the invention.

In FIG. 9 is shown a pallet having two end runners 49 (only one of which is partially shown) and a middle runner 51. The runners 49 and 51 are of retangular shape in cross-section. Emplaced and suitably secured to the top portions of the plastic runners 49 and 51 are thin plywood strips 53. The strips 53 are secured to the runners 49 and 51 by means of the adhesive which was preapplied to the runners described in the foregoing embodiments of the invention.

The plywood strips are very effective in adding strength and structural rigidity to the runners 49 and 51. Adhesive is preapplied to the top portions of the strips 53 in order that cross-slats 7 may be suitably secured to the strips 53.

It is within the concept of this invention to emplace thin plywood strips to both the top and bottom portions of the runners 49 and 51 as well as the runners 3, 5, 11, 3 to add strength and structural rigidity to the basic elements or runners 3, 5, 11, 13, 49 and 51.

Having thusly described my invention, I claim:

1. A pallet structure comprising runners and cross-slats; said runners being of plastic material, said cross-slats being of wood, said runners having areas of adhesive preapplied thereon and paper stripping covered over said adhesive areas; said runners and cross-slats being adapted for breakdown disassemblies for storing or shipping as a pallet unit; one of said disassemblies having one of said runners disposed and arranged on top, the remaining ones of said runners arranged and disposed on the bottom with said cross-slats arranged and disposed to be contained between said runners; the other of disassemblies having said runners arranged and disposed back to back with said cross-slats arranged and disposed on the sides of two of said runners; said runners and cross-slats being assembled a a pallet by the method of the following steps: the first step consisting of removing said paper stripping covering said adhesive areas on said runners, the second step consisting of arranging and disposing said cross-slats on said adhesive areas of said runners, and the third step consisting of joining and bonding said cross-slats to said adhesive areas of said runners by application of pressure.

2. The subject matter as claimed in claim 1, wherein one of the said runners is T-shaped and the remaining ones of said runners are L-shaped.

3. The subject matter as claimed in claim 1, wherein said runners have cut-out portions complemental to the cross-sectional areas of said cross-slots and said cross-slates are received in said cut-out portions.

4. The subject matter as claimed in claim 1, wherein said runners have aligned lengthwise slots formed therein for insertion of the fork lift elements of a fork life truck.

References Cited in the file of this patent

UNITED STATES PATENTS

| | | |
|---|---|---|
| 2,371,106 | Lewis et al. | Mar. 6, 1945 |
| 2,372,055 | Braun | Mar. 20, 1945 |
| 2,465,134 | Toffolon | Mar. 22, 1949 |
| 2,503,562 | Porter | Apr. 11, 1950 |
| 2,640,669 | Ashford | June 2, 1953 |
| 2,705,120 | Owen | Mar. 29, 1955 |
| 2,926,793 | Sparks et al. | Mar. 1, 1960 |
| 2,933,339 | Aivden | Apr. 19, 1960 |
| 3,058,709 | Moss | Oct. 16, 1962 |

FOREIGN PATENTS

| | | |
|---|---|---|
| 699,130 | Great Britain | Oct. 28, 1953 |